United States Patent
Deo et al.

[11] Patent Number: 6,157,982
[45] Date of Patent: Dec. 5, 2000

[54] SYSTEM AND METHOD FOR REMOTELY MANAGING MEMORY IN A PORTABLE INFORMATION DEVICE FROM AN EXTERNAL COMPUTER

[76] Inventors: Vinay Deo, 15606 NE. 40th St. #G225, Redmond, Wash. 98052; Neil S. Fishman, 23710 22nd Dr. SE., Bothell, Wash. 98021

[21] Appl. No.: 08/394,659

[22] Filed: Feb. 22, 1995

[51] Int. Cl.[7] ...................................................... G06F 15/20
[52] U.S. Cl. ........................ 711/100; 711/101; 711/102; 711/104; 711/105; 709/212; 709/213; 709/216; 710/31; 710/32
[58] Field of Search ............................ 364/900; 395/927, 395/404, 406, 427, 402, 405, 442; 711/100, 102, 101, 104, 105, 115; 709/212, 213, 216; 710/31, 32

[56] References Cited

U.S. PATENT DOCUMENTS

| | | | |
|---|---|---|---|
| 4,534,012 | 8/1985 | Yokozawa | 364/900 |
| 4,999,616 | 3/1991 | Uemura et al. | 340/706 |
| 4,999,617 | 3/1991 | Uemura et al. | 340/706 |

OTHER PUBLICATIONS

PC Week. "Data Link takes a lickin' and some extra clickin'". Nov. 21, 1994, v11 n46 p. 83.

*Primary Examiner*—Do Hyun Yoo
*Assistant Examiner*—Than V. Nguyen
*Attorney, Agent, or Firm*—Lee & Hayes, PLLC

[57] ABSTRACT

A system and method are provided for remotely managing memory in a programmable portable information device, such as a programmable watch, from an external computer. The portable information device has an optical sensor and a rewritable data memory. The computer has a frame-scanning graphics display device and a memory with a capacity larger than that of the device memory. The device memory is mapped into a portion of the computer memory to create a virtual device memory therein. An input device for the computer is provided to permit a user to enter programming changes to be made to the information device,. The programming changes alter the virtual device memory within the computer memory from an initial arrangement to a modified arrangement. Upon modification, a memory manager resident in the computer determines what memory transactions are effective to change the virtual device memory from its initial arrangement to its modified arrangement. An optical pattern generator in the computer produces a sequence of changing optical patterns which represents a serial stream of data indicative of the memory transactions. The graphics display device displays the sequence of changing optical patterns to optically transmit a serial stream of data that can be detected by the optical sensor of the portable information device. The memory transactions are then used by the portable information device to update its memory.

13 Claims, 6 Drawing Sheets

SYSTEM AND METHOD FOR REMOTELY MANAGING MEMORY IN A PORTABLE INFORMATION DEVICE FROM AN EXTERNAL COMPUTER

TECHNICAL FIELD

This invention relates to systems and methods for remotely managing memory in programmable portable information devices from external computers. More particularly, this invention relates to systems and methods for remotely managing memory in programmable watches using memory managers resident in external desk-top or laptop computers.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows™ which maintains daily appointment schedules, to-do lists, personal notes, and calendar planning. This information is often a duplicate of that maintained on the portable personal organizer.

Timex Corporation of Middlebury, Conn., has recently introduced the Timex® Data-Link™ watch. This watch utilizes new technology for transferring information from a personal computer to a watch. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam which sequentially scans each row of pixels beginning with the top row and ending with the bottom row. It is this characteristic of a CRT and of other scanned display devices which is utilized to transmit serial data to the Data-Link™ watch. To transfer data to the watch, the watch is held near and facing the CRT. The computer is programmed to display a sequence of display frames in which spaced horizontal pixel lines represent individual bits of data to be transferred. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. As used herein, the term "display frame" means a single screen-size image made up of a matrix of pixels. A display frame is generally created by sequentially illuminating or refreshing the pixels of the display device.

One of the drawbacks in remotely programming small-size personal organizers is that there is no convenient way to partially download data. Instead, entire data sets must be fully downloaded during each programming session. If a data entry error is made or the user wishes to make a change, the user must fix the error or make the change at the computer end and then transmit the entire data set back to the watch to essentially reprogram it, even though the data entry error or change might be minor.

The inability to partially download data is primarily due to the fact that the watch can only receive information from the computer CRT, but cannot send any information back. That is, the optical communication channel is one-way from the CRT to the watch. This one-way communication makes partial downloading extremely difficult.

Limited memory capacity of compact personal organizers is another significant reason that inhibits the ability to intelligently move data and accept partial new data on the watch. The Timex® Data-Link™ watch has approximately 1 Kbyte of DRAM (Dynamic Random Access Memory) for storing data and approximately 23 Kbytes of ROM (Read Only Memory) for storing programs and functions. There is simply no space for maintaining local memory management functions. Even when memory capacity improves in personal organizers, as it is expected to do, designers will most likely strive to fully utilize all memory capacity for storing data and program instructions as opposed to reserving significant space for memory management.

Furthermore, processing capabilities and power of portable personal devices are limited. Providing local memory management functions might simply be too overwhelming.

Accordingly, it is an object of this invention to provide a memory management technique that enables a user to partially download data from the computer to the electronic personal organizer.

SUMMARY OF THE INVENTION

This invention relates to a system and method for remotely managing memory in a portable information device, and particularly a programmable watch, from an external computer. A map of the device memory is maintained in the computer memory as a virtual device memory. When a user wishes to reprogram or enter new data to the portable information device, the user first enters the changes on the computer. These changes alter the virtual device memory maintained in the computer memory from an initial data arrangement to a modified arrangement. A memory manager resident in the computer analyzes the modifications made to the virtual device memory and derives a set of efficient memory transactions that cause the alteration from initial to modified data arrangements. Sometimes, the memory transactions require little more than a repositioning of data pointers. The computer then transmits the memory transactions to the information device which efficiently updates its own memory.

The memory management functions are thereby provided remotely from the portable information device. The remote memory manager consumes no ROM space or CPU resources of the device. Additionally, data can be partially or fully downloaded to the portable information device in an efficient and convenient manner.

According to one aspect of this invention, the portable information device is configured with an optical sensor. The computer has a frame-scanning graphics display device and an input device. The user enters programming changes for the information device into the computer via the input device. The programming changes alter the virtual device memory within the computer memory from an initial arrangement to a modified arrangement. Upon modification, a memory manager resident in the computer determines what memory transactions are effective to change the virtual device memory from its initial arrangement to its modified arrangement. An optical pattern generator, also resident in the computer, produces a sequence of changing optical patterns which represent a serial stream of data indicative of the memory transactions. The frame-scanning graphics display device displays the sequence of changing optical patterns to optically transmit a serial stream of data that can be detected by the optical sensor of the portable information device. The memory transactions are then used by the portable information device to update its memory.

BRIEF DESCRIPTION OF THE DRAWINGS

The same reference numerals are used throughout the disclosure to reference like components and features.

DETAILED DESCRIPTION OF THE PREFERRED EMBODIMENT

Figure 1:
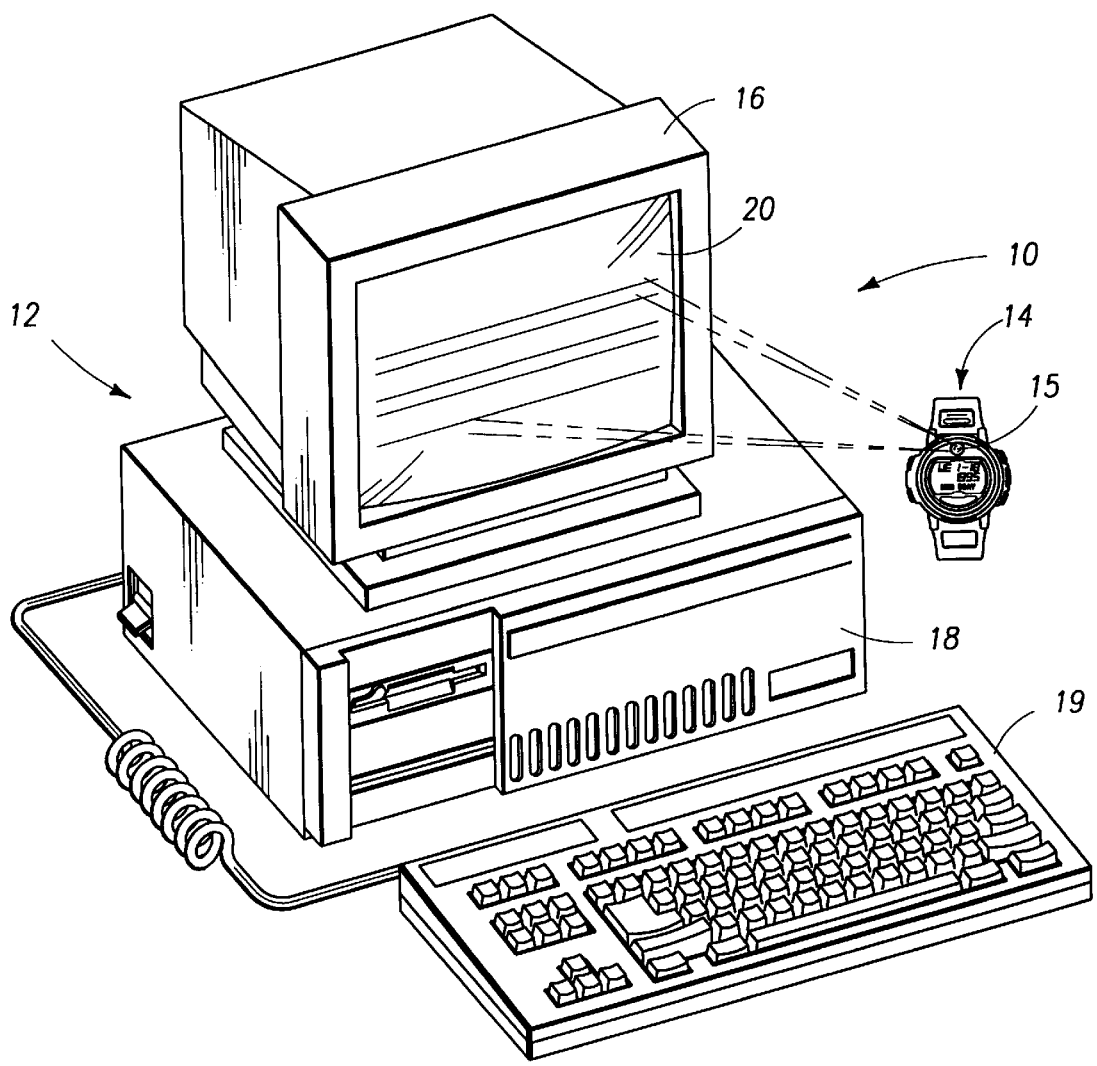
FIG. 1 is a diagrammatic illustration of a system for remotely managing a memory of a programmable watch from an external desk-top computer according to one embodiment of this invention.

FIG. 1 shows a personal electronic time management system 10 according to one embodiment of this invention. Time management system 10 includes a computer system 12 and a portable information device in the form of programmable watch 14. A data transmission interface is provided to enable computer system 12 to program watch 14 by transferring programming information thereto. In the preferred embodiment, the computer and watch are interfaced via a remote, optical coupling whereby data is transferred optically. Other data transmission interfaces can be used, however, such as radio communication and infrared communication.

In the illustrated embodiment, watch 14 is constructed with an optical sensor 15. Computer system 12 remotely programs watch 14 by optically transmitting a serial stream of data that can be detected and deciphered by watch 14. The preferred embodiment of this invention involves a programmable watch, such as the commercially available Timex® Data-Link™ watch, which can be configured to function as a portable personal time manager. Accordingly, the invention will be described herein within the context of a programmable watch. However, other forms of portable information devices can be used, such as pagers and personal digital assistants (PDAs). As used herein, "portable information device" means a small, portable, electronic apparatus that has limited processing capabilities, limited power resources, and limited rewritable memory capacity. The Data-Link™ watch, for example, is presently constructed with a rewritable memory capacity of approximately 1 Kbyte.

Computer system 12 includes a visual display device 16, a central processing unit (CPU) 18 having a processor and memory, and a keyboard 19 (or other input device). The illustrated computer system is an IBM®-compatible system, although other architectures, such as Apple®-compatible systems, can be employed. Visual display device 16 is a frame-scanning graphics display device, such as a CRT (Cathode Ray Tube) monitor that is commonly used in personal computers. The graphics display device shows a sequence of display frames containing graphical images on monitor screen 20. A "display frame" or "frame" means a single screen-size image made up of a matrix of pixels. The frames are displayed successively at an effective rate that they appear visually constant on the monitor screen 20, rather than flickering. One type of conventional CRT monitor operates at 60 Hz, meaning that the monitor screen 20 is refreshed once every $\frac{1}{60}$ or 0.01667 second. In contrast, the human eye only begins to perceive a non-constant flickering at a much slower frequency of about 10 Hz.

As discussed above, the pixels of a CRT are illuminated individually by an electron beam (i.e., the cathode ray) which sequentially scans each row of pixels beginning with the top row and ending with the bottom row. The beam is deflected horizontally (in the line direction) and vertically (in the field direction) to scan an area of the screen to produce a single display frame. The electron beam strikes phosphors positioned at the screen of the CRT monitor to cause them to glow. The phosphors continue to glow for a sufficient time interval until the electron beam return s during the next frame scan to refresh them. The phosphors are arranged according to a desired pixel pattern, which is customarily a matrix of rows and columns. Conventional color VGA monitors typically have a resolution of 640×480 pixels or better. The linear scanning electron beam is utilized to transmit serial data to programmable watch 14. Software loaded in CPU 18 generates a sequence of frames having changing optical patterns that is displayed on the CRT monitor 16. The optical patterns transmit machine-readable information that can be detected by optical sensor 15 and used to program the programmable watch 14. Preferably, the optical patterns consist of sets of parallel, horizontal, contiguously-scanned lines that traverse across screen 20. The lines appear at optical sensor 15 as serial data. Each display frame depicted on the screen includes one or more lines which represent respective groups of data bits that comprise programming information used to program the watch 14.

Figure 2:
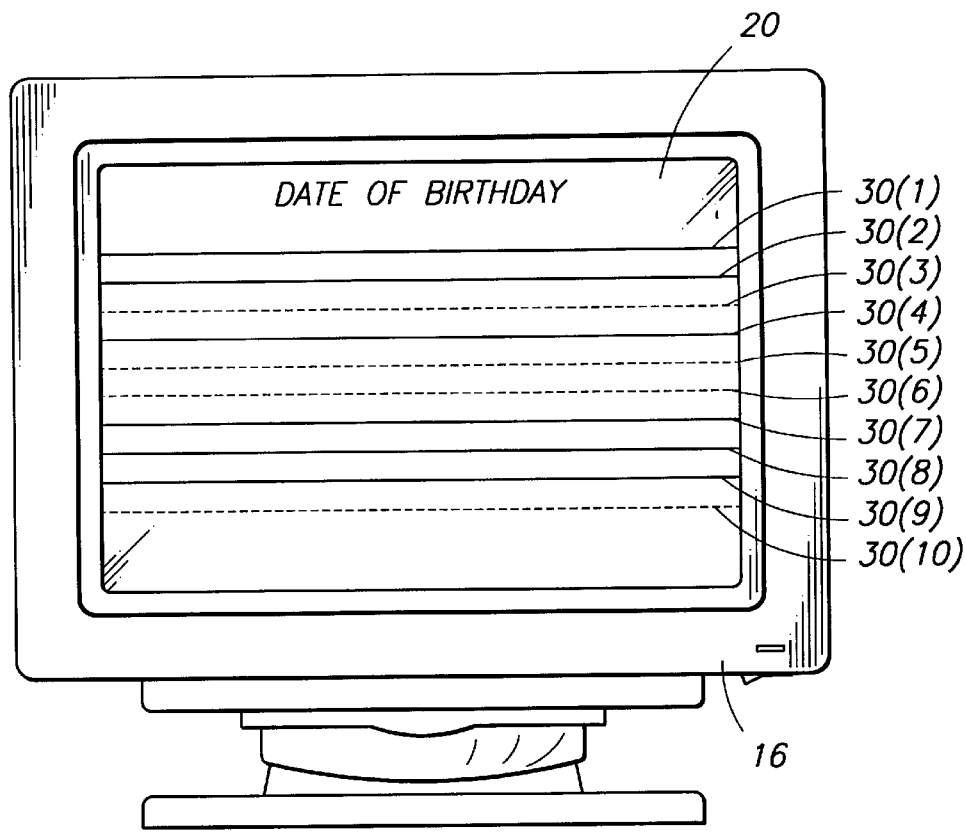
FIG. 2 is a diagrammatic front view of a CRT monitor depicting a display frame having contiguously-scanned lines used to convey bits of information to the programmable watch.

FIG. 2 shows a preferred optical pattern in more detail. Assuming that each frame transmits a single 8-bit byte with start and stop bits, a frame contains a possible ten contiguously-scanned lines 30(1)–30(10). The dashed horizontal lines are shown only for illustration purposes to represent the absence of lines. Each line position conveys one data bit of information. Bits having a first binary value, such as a value '0', are represented by illuminated lines (e.g., lines 30(1), 30(2), 30(4), and 30(7)–30(9)) and bits having a second binary value, such as a value '1', are represented by non-illuminated lines (as illustrated pictorially by the dashed lines 30(3), 30(5), 30(6), and 30(10)). The lines are spaced at a selected distance to produce a desired temporal spacing appropriate for the data receiving electronics of watch 14. The line spacing effectively establishes the transmitted bit rate. Additionally, to scan an entire horizontal line, the electron beam of the CRT monitor is pulsed for a sufficient duration that it can be detected by optical sensor and associated electronics. In contrast to more conventional serial bit transmission in which '0' and '1' bits are represented by voltage levels, watch 14 is programmed to respond to rising edges. Accordingly, the electron beam of the CRT does not need to be "on" for an entire bit transmission period. The watch has internal conversion circuitry which detects the rising edge from optical sensor 15 created by a single horizontal illuminated scan of the CRT, and which in response produces a level-based signal appropriate for reception by a conventional UART.

For each programming instruction or data to be transmitted to the watch, the software resident in the CPU 18 causes the CRT monitor 16 to selectively illuminate the appropriate horizontal lines representing '0' bits by scanning the associated rows of pixels. The horizontal lines that represent '1' bits are left non-illuminated. The middle eight lines 30(2) –30(9) represent one byte of programming information being optically transmitted to watch 14. Top line 30(1) represents a start bit and bottom line 30(10) represents a stop bit that are used for timing and error detection. Because of the scanning nature of the cathode ray of CRT monitor 16, these patterns produce a serial light emission from CRT monitor 16 which is representative of a serial bit stream. Each display frame represents one byte. A new line grouping is presented for each sequential display frame so that each such display frame represents a different data byte.

Figure 3:
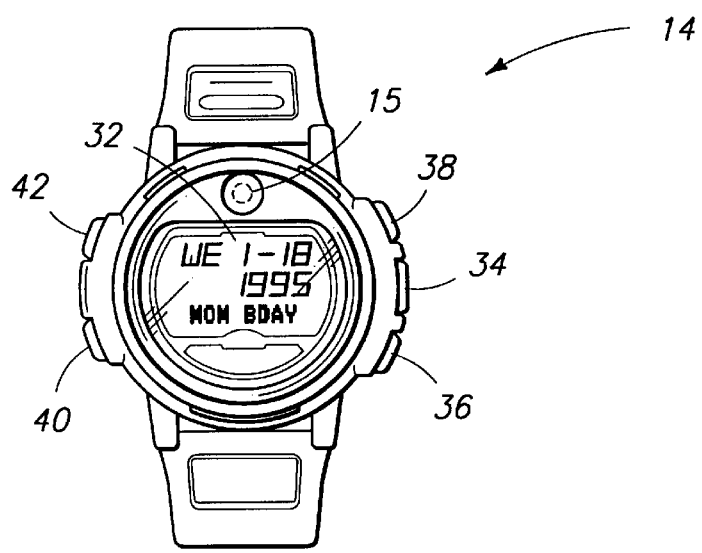
FIG. 3 is a diagrammatic front view of the programmable watch having an optical sensor according to a first construction of this invention.
Figure 4:
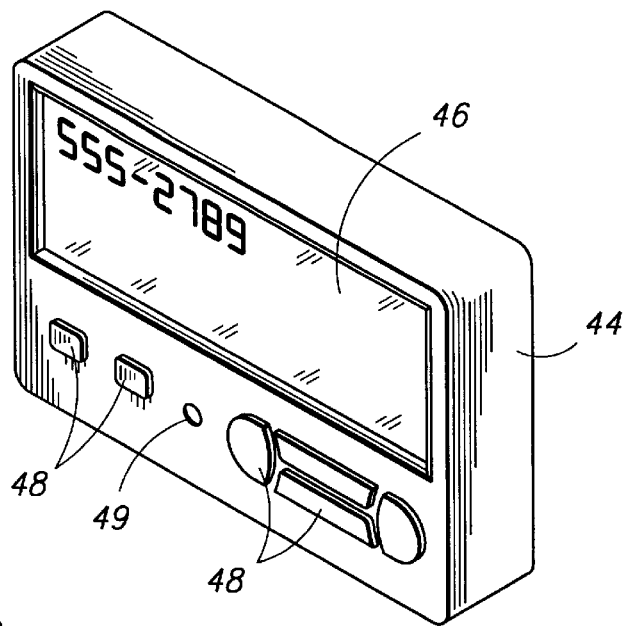
FIG. 4 is a diagrammatic front view of a programmable portable information device according to another construction of this invention.

FIG. 3 shows an external face of the programmable watch 14, which is illustrated for discussion proposes as the Timex® Data-Link™ watch. It is noted that other watch constructions as well as other portable information devices can be used in the context of this invention. Watch 14 includes a small display 32 (such as an LCD), a mode select button 34, a set/delete button 36, next/previous programming buttons 38 and 40, and a display light button 42. Optical sensor 15 is positioned adjacent to display 32. In the programming mode, display 32 indicates the programming option, and what data is being entered therein. During the normal operational mode, display 32 shows time of day, day of week, or any other function common to watches. FIG. 4 shows an alternative embodiment of a portable information device 44 of this invention in the form of a pager or personal digital assistant (PDA). Device 44 has an LCD 46, a keypad 48 for entering data, and an optical sensor 49. Like watch 14, device 44 can be optically programmed from a visual display device, such as a scanned-pixel monitor. For description purposes, the invention continues to be described in the context of the watch embodiment.

Figure 5:
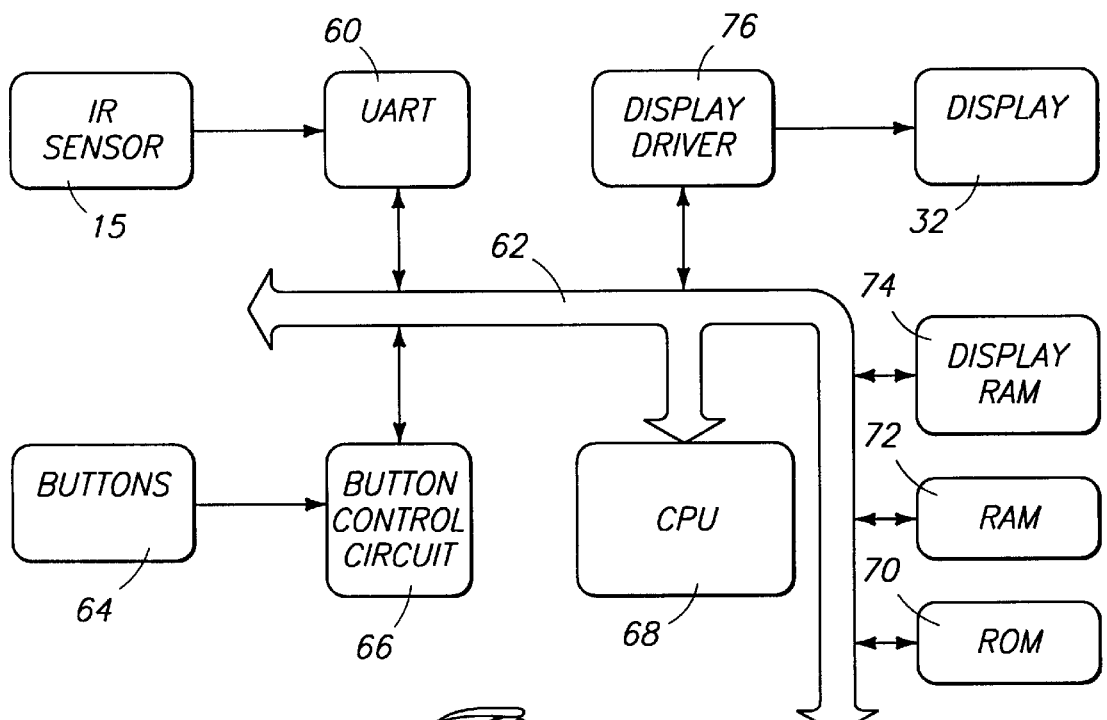
FIG. 5 is a block diagram of an electronic configuration of the programmable watch according to this invention.

FIG. 5 shows an electronic configuration of programmable watch 14 according to one possible construction. Optical sensor 15 is preferably a commercially available infrared (IR) sensor. One example IR sensor is an IR photodetector manufactured by Quality Technologies and sold under the part number DIGIKEY BPW36QT-ND by Digikey Corporation, 701 Brooks Ave., Thief River Falls, Minn. 56701. Other manufacturing companies, such as Panasonic, also produce suitable IR sensors.

IR sensor 15 is coupled to a digital serial receiver, better known as a UART (Universal Asynchronous Receiver/Transmitter) 60. The UART decodes the optical patterns to extract the data bits transmitted from the computer. As discussed above, watch 14 includes conversion circuitry (not shown) to produce a level-based serial signal from the edge-based signal generated by computer 12. The UART is coupled to an internal bus 62, which is preferably an eight-bit bus. Inputs received from the control buttons on the watch, referenced generally by box 64, are detected and deciphered by button control circuit 66 and placed on bus 62. The watch also includes a CPU (Central Processing Unit) 68 for performing the data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM is provided to temporarily store data used by display driver 76 to depict visual information on display 32. These components, excluding the UART circuit, can be incorporated into a single microprocessor-based integrated circuit. One appropriate microprocessor IC is available from Motorola Corporation as model MC68HC05HG.

To program the watch, the computer is first loaded with a compatible time management software and optical pattern generating software. One example time management software is Microsoft's® Schedule+™ for Windows™ and a suitable optical pattern generating software is Timex® Data-Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 15 in juxtaposition with monitor screen 20. A sequence of changing optical patterns having horizontal contiguously-scanned lines begin to flash across the monitor screen as shown in FIGS. 1 and 2 to optically transmit data regarding the various appointments and tasks. In about 20 seconds, the system will have transmitted as many as 70 entries, including the birthday reminder. These entries are kept in data RAM 72.

Until the present invention, when a user accidentally entered data wrong or wished to make a minor adjustment to the scheduling information, the entire programming process had to be repeated. The user would first make the correction on the computer and reinitialize the watch for data transmission. The entire set of data, including the correction or adjustment, was then retransmitted and placed once again back into RAM 72. There was no convenient way to partially download data. This inconvenience was partly caused by the inherent one-way data communication (i.e., the ability to send data only from the CRT to the watch and not from the watch back to the computer) and partly due to the limited memory capacity of the watch. In the Timex® watch, for example, there is not enough space in the 23 Kbyte ROM to store local memory managment services for managing the 1 Kbyte RAM. Additionally, the CPU resources are too limited to adequately maintain and perform local memory management functions.

Accordingly, this invention generally concerns a technique for remotely managing the data memory in programmable watch 14 from an external programming unit, such as computer 12. A special watch memory manager dedicated to managing the watch memory is established in the computer to take advantage of the abundant computer resources. The computer has a memory of substantial capacity that is magnitudes larger than the watch memory, as well as other bountiful resources (such as processing capability and speed) that are not available on the portable watch. The remote memory management system of this invention is described below in more detail with reference to the block diagrams of FIGS. 6 and 7, and to the flow diagram of FIG. 8.

Figure 6:
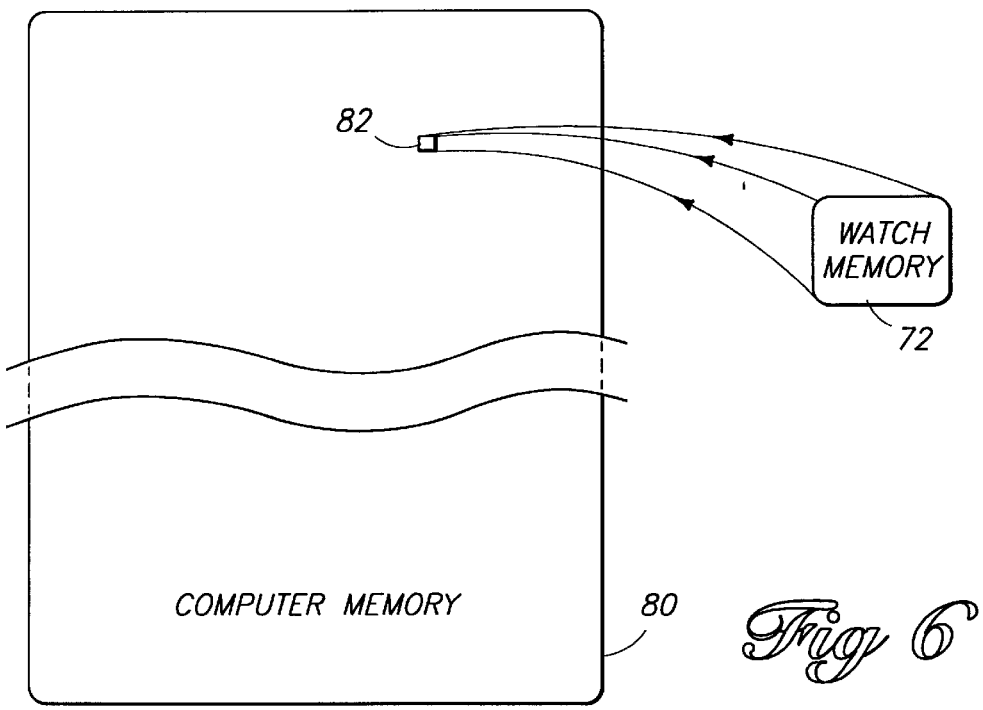
FIG. 6 is a diagrammatic illustration of a computer memory containing a virtual memory map of a watch memory.

FIG. 6 shows the computer memory 80 and the watch memory 72. Computer memory 80 has a capacity that is typically on the order of 8–16 Mbytes of RAM and 250 Mbytes to 1 Gigabyte of harddisk space for personal desktop computers, whereas the RAM watch memory 72 is only about 1 Kbyte. According to one aspect of this invention, watch memory 72 is mapped into a portion of the computer memory 80 to create a virtual watch memory 82 (step 100 in FIG. 8). In this manner, the virtual watch memory 82 represents, and more preferably, mirrors the watch memory 72. The mirrored memory scheme allows the user to modify the virtual watch memory within the computer memory and then, when finished, efficiently download the memory modifications from the computer to the watch memory to update the watch memory to reflect the user changes.

Figure 7:
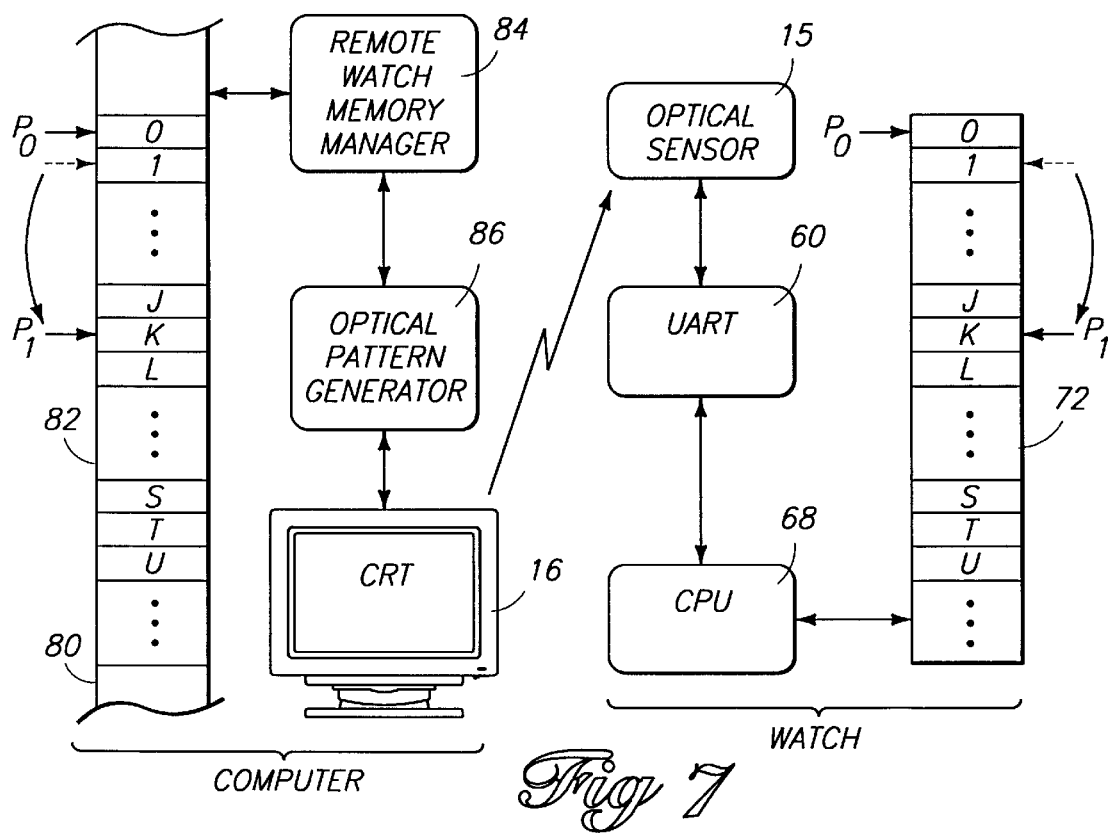
FIG. 7 is a block diagram of a remote memory management system for the programmable watch.

FIG. 7 shows the interaction of the watch memory 72 and virtual watch memory 82 in more detail. Watch memory 82 is shown with a pair of data pointers $P_0$ and $P_1$ used to access locations within the memory. One example type of pointers are queue head and queue tail pointers employed in a linked data list. The virtual watch memory 82 is mapped with an identical corresponding pair of data pointers $P_0$ and $P_1$. In this example, the memories have an initial arrangement wherein data pointer $P_0$ is located at memory location 0 and data pointer $P_1$ is located at memory location 1. A remote watch memory manager 84 is provided within the computer to maintain the mapping relationship between the watch memory 72 and virtual watch memory 82.

Figure 8:
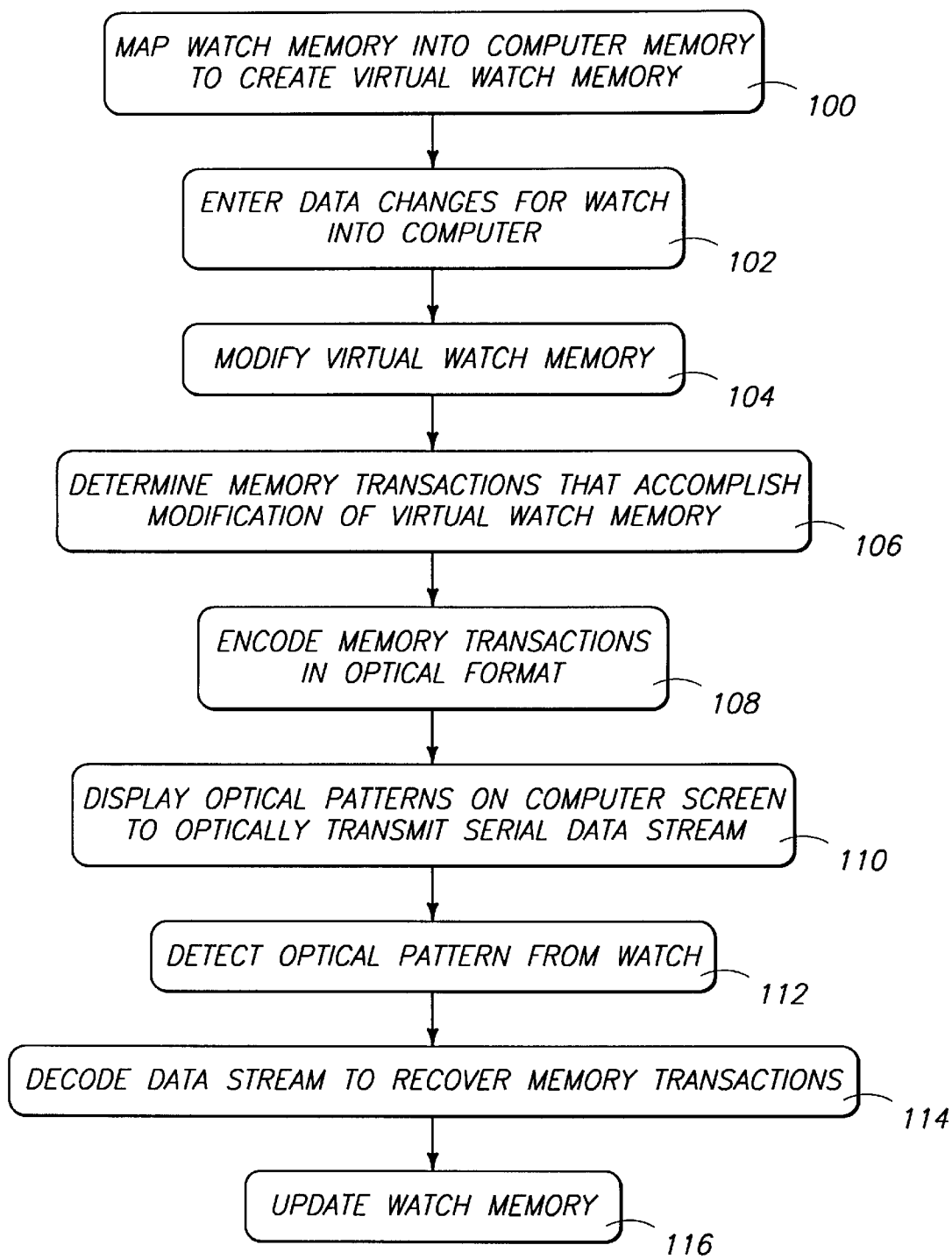
FIG. 8 is a flow diagram of a method of preferred steps for remotely managing the watch memory.

When a user desires to change the data or functions of the programmable watch, the user enters programming changes for the watch into the computer via keyboard 19 or other input device (step 102 in FIG. 8). The programming changes alter the virtual watch memory 82 within the computer memory 80 from an initial memory arrangement to a modified memory arrangement (step 104 in FIG. 8). For illustration purposes, suppose that the programming change causes a movement of data pointer $P_1$ (e.g., a queue tail pointer) from location 1 to location K. Remote watch memory manager 84, resident at the computer, determines what memory transactions are effective to change the data pointer $P_1$ from location 1 to location K (step 106 in FIG. 8). Here, since only a data pointer has been moved, the watch memory manager 84 simply compares location of the data pointers in the virtual watch memory prior to and following the user input and derives an efficient set of instructions that effectuate relocation of the data pointers within the virtual watch memory. In this case, a simple command to move data pointer $P_1$ from location 1 to location K is the only memory transaction.

When the user makes considerable changes, however, many memory transactions are conducted to accomplish the resultant memory modification. According to an aspect of this invention, watch memory manager 84 within the computer analyzes the modifications made to the virtual watch memory upon completion of data entry by the user. The watch memory manager 84 derives a least number of memory transactions that are effective to change the virtual watch memory from its initial arrangement to its modified arrangement. By reducing the memory changes to a most reduced set of memory transactions, significantly less data can be transferred from the computer to the watch. This helps preserve the CPU resources of the watch by limiting the number of memory transactions that are made to the watch memory as well as minimize or elminate any capacity of the on-chip ROM that is dedicated to memory management.

The watch memory manager 84 sends the memory transactions to optical pattern generator 86 which produces a sequence of changing optical patterns (step 108 in FIG. 8). The optical patterns represent a serial stream of data indicative of the memory transactions. As noted above, the horizontal lines shown in FIG. 2 form one example optical pattern. The optical pattern is displayed on CRT monitor 16 to optically transmit the serial data stream to optical sensor 15 (step 110 in FIG. 8). At the programmable watch, the optical pattern is detected by optical sensor 15 (step 112 in FIG. 8) and decoded in UART 60 to extract the memory transactions (step 114 in FIG. 8). In this case, a single instruction byte in the form of a data pointer move command is transmitted from the CRT to the watch. The watch CPU 68 then uses the memory transactions to update watch memory 72 per the user changes input to computer 12 (step 116 in FIG. 8). As shown in FIG. 7, the watch CPU 68 moves data pointer $P_1$ from location 1 to location K in watch memory 72.

The remote watch memory management of this invention provides significant advantages in terms of programming efficiency, memory utility, and resource preservation. By locating the watch memory manager remotely from the watch and within the computer, the remote memory manager consumes no ROM space or CPU resources of the watch. Additionally, the data transmission is less time consuming due to the ability to partially download data. By first making the changes to the virtual watch memory and then analyzing the changes to derive a set of efficient memory transactions, only the reduced set of data is optically transmitted to the watch. Thus, if the user simply changes the date of his/her appointment, only that information needs to be transferred to the watch. The partial downloading promotes programming efficiency, as compared to the prior technique of fully reprogramming the watch each time a data change is made. Furthermore, less power is consumed because the watch performs fewer memory transactions.

The remote memory manager can also rearrange the virtual watch memory at the computer using data packing routines and the like to more fully utilize the memory space or improve access speed. When the virtual watch memory is rearranged, pointer relocation instructions and any additional rearrangement information can be efficiently transferred to the watch to improve its memory layout.

Figure 9:
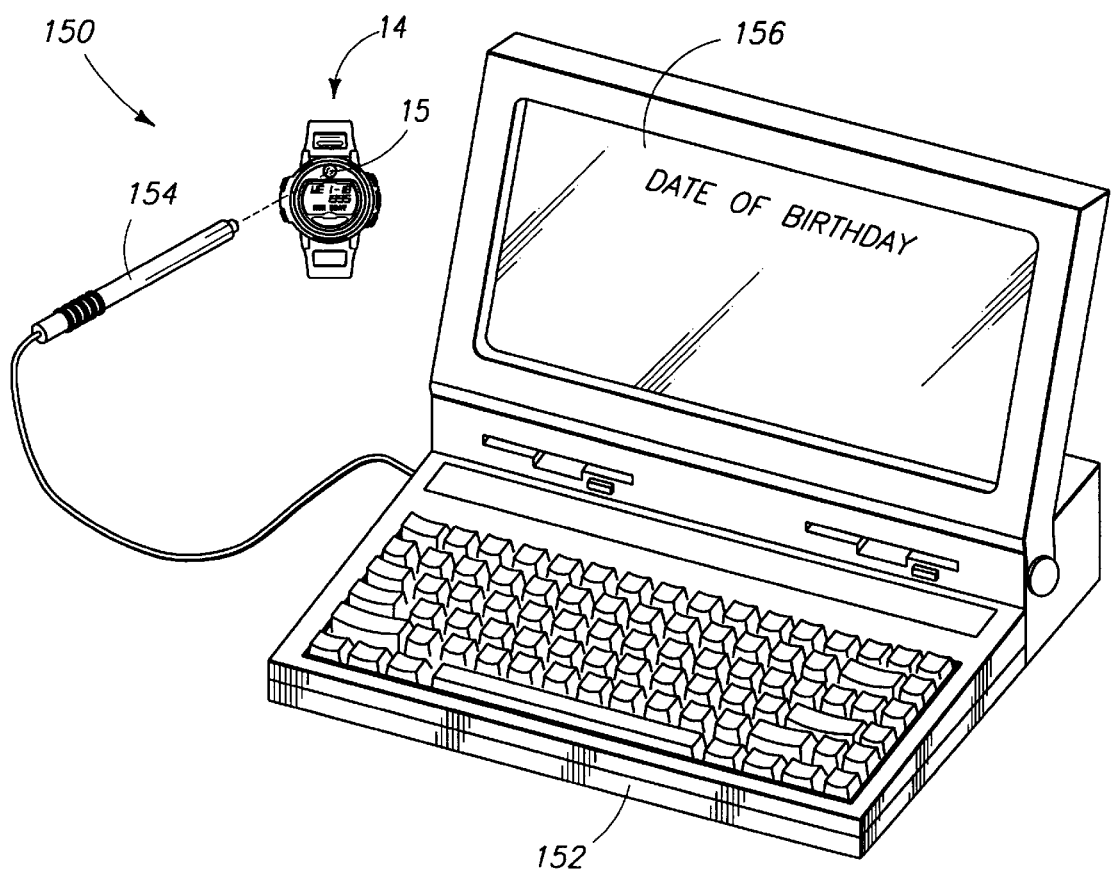
FIG. 9 is a diagrammatic illustration of a system for remotely managing the watch memory from an external laptop computer according to another embodiment of this invention.

FIG. 9 shows an alternative construction of a personal time management system 150 for remotely managing memory in a programmable watch 14. System 150 includes watch 14, a portable computer 152 (such as a laptop or palmtop computer), and a light wand 154. Portable computer 152 has a flat panel screen 156, such as a passive LCD screen. In this embodiment, the light wand 154 serves as the source of the data-transmitting optical patterns. The light wand is connected to the parallel or serial port of the portable computer and receives programming signals from the pattern generating software loaded in the portable computer. In response to the programming signals, wand 154 generates a series of pulsed light bursts that are used to program the watch. The wand is held close to the watch face so that optical sensor 15 can detect the series of light bursts. Like the above described embodiment, the laptop includes a remote memory manager which maps the watch memory into the laptop memory to create a virtual watch memory. In this manner, a user can arrange scheduling information on his/her laptop, and then conveniently download the information to the watch via the light wand.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for remotely managing a data memory in a programmable portable information device from a computer external to the portable information device, the computer having a memory, the method comprising the following steps:

interfacing the portable information device and computer to enable the computer to program the information device by transferring programming information thereto;

mapping the information device memory into a portion of the computer memory to create a virtual device memory within the computer memory, the virtual device memory having an initial arrangement;

entering into the computer the programming information to be transferred to the portable information device;

modifying the virtual device memory within the computer memory in accordance with the programming information entered into the computer, the virtual device memory having a modified arrangement following said modifying step;

determining what memory transactions are effective to change the virtual device memory from its initial arrangement to its modified arrangement;

transferring the memory transactions from the computer to the portable information device to modify the information device memory; and updating the information device memory using the memory transactions.

2. A method according to claim 1, wherein:

the interfacing step comprises remotely, optically coupling the portable information device and the computer; and the transferring step comprises optically transmitting the memory transactions from the computer to the information device memory.

3. A method according to claim 1, wherein:

the determining step comprises deriving a least number of memory transactions that are effective to change the virtual device memory from its initial arrangement to its modified arrangement; and the transferring step comprises transferring the least number of memory transactions.

4. A method according to claim 1, further comprising:

providing a set of data pointers within the device memory;

providing a corresponding set of data pointers within the virtual device memory, the data pointers in the virtual device memory being identical to the data pointers in the information device memory;

whereupon modification to the virtual device memory, comparing location of the data pointers in the virtual device memory from initial pointer locations before the modification to modified pointer locations following the modification;

deriving pointer relocation instructions that effectuate relocation of the data pointers within the virtual device memory from the initial to modified pointer locations; and transferring the pointer relocation instructions from the computer to the portable information device to relocate the data pointers in the information device memory.

5. A method for remotely managing a data memory in a programmable portable information device using optical serial data transmission from a computer external to the portable information device, the computer having a frame-scanning graphics display device and a memory, the computer memory containing a memory map of the information device memory to provide a virtual device memory within the computer memory, the programmable information device having an optical sensor, the method comprising the following steps:

entering into the computer programming information to be transferred to the portable information device;

modifying the virtual device memory within the computer memory from an initial arrangement to a modified arrangement in accordance with the programming information entered into the computer;

determining what memory transactions are effective to change the virtual device memory from its initial arrangement to its modified arrangement;

encoding the memory transactions as a sequence of display frames containing changing optical patterns used to optically transmit a serial stream of data;

displaying the sequence of display frames on the frame-scanning graphics display device to optically transmit the serial stream of data;

detecting the display frames via the optical sensor of the portable information device to optically receive the serial stream of data indicative of the memory transactions; and updating the information device memory using the memory transactions.

6. A method according to claim 5, wherein:

the step of displaying the sequence of display frames comprises displaying sets of serially and contiguously scanned lines that extend across the graphics display device.

7. A system for remotely managing memory in a programmable watch, the system comprising:

a programmable watch having a memory;

a programming unit external to the watch, the programming unit providing programming information to program the watch, the programming unit having a memory with a capacity larger than that of the watch memory;

a remote watch memory manager provided in the programming unit, the watch memory manager mapping the watch memory into a portion of the programming unit memory to create a virtual watch memory therein;

the programming unit being configured to permit a user to enter programming changes to be made to the watch, the programming changes altering the virtual watch memory from an initial arrangement to a modified arrangement;

whereupon modification to the virtual watch memory, the remote watch memory manager determines what memory transactions are effective to change the virtual watch memory from its initial arrangement to its modified arrangement; and a data transmission interface to transfer the memory transactions from the programming unit to the watch to update the watch memory to include the user programming changes.

8. A system according to claim 7, wherein:

the programming unit comprises a desk-top computer.

9. A system according to claim 7, wherein:

the programming unit comprises a computer having a frame-scanning graphics display device; and the data transmission interface comprises an optical pattern generator resident at the computer to produce optical patterns for display on the graphics display device and an optical sensor resident on the watch to detect the optical pattern so that data can be optically transmitted from the graphics display device to the optical sensor on the watch.

10. A system according to claim 7, wherein:

the remote watch memory manager derives a least number of memory transactions that are effective to change the virtual watch memory from its initial arrangement to its modified arrangement.

11. A system according to claim 7, wherein:

the watch memory has a set of data pointers;

the virtual watch memory has a corresponding set of data pointers;

whereupon modification to the virtual watch memory, the remote watch memory manager compares location of the data pointers in the virtual watch memory from initial pointer locations before the modification to modified pointer locations following the modification and derives pointer relocation instructions that effectuate relocation of the data pointers within the virtual watch memory from the initial to modified pointer locations; and the data transmission interface transfers the pointer relocation instructions from the programming unit to the watch to relocate the data pointers in the watch memory.

12. A system for remotely managing memory in a programmable portable information device from an external computer, the system comprising:

a programmable portable information device having an optical sensor and a rewritable data memory;

a computer external to the portable information device, the computer having a frame-scanning graphics display device and a memory with a capacity larger than that of the device memory;

a remote device memory manager resident in the computer, the memory manager mapping the device memory into a portion of the computer memory to create a virtual device memory therein;

the computer having an input device to permit a user to enter programming changes to be made to the information device, the programming changes altering the virtual device memory within the computer memory from an initial arrangement to a modified arrangement;

whereupon modification to the virtual device memory, the memory manager determines what memory transactions are effective to change the virtual device memory from its initial arrangement to its modified arrangement;

an optical pattern generator to produce a sequence of changing optical patterns which represent a serial stream of data indicative of the memory transactions;

the frame-scanning graphics display device displaying the sequence of changing optical patterns to optically transmit a serial stream of data that can be detected by the optical sensor of the portable information device; and the portable information device updating its memory in accordance with the memory transactions optically transmitted from the frame-scanning graphics display device.

13. A memory device management system for a programmable watch, the system comprising:

a watch memory resident on a programmable watch, the watch memory having a set of data pointers;

virtual watch memory that represents the watch memory, the virtual watch memory being external to the watch and having a corresponding set of data pointer;

a memory manager external to the watch but remotely couplable to manage the watch memory, the memory manager managing arranging of data wihtin the virtual watch memory and updating the watch memory to reflect any data arrangement change in the virtual watch memory; and whereupon modification to the virtual watch memory, the memory manager compares location of the data pointers in the virtual watch memory from initial pointer locations before the modification to modified pointer locations following the modification and derives pointer relocation instructions that effectuate relocation of the data pointers within the virtual watch memory from the initial to modified pointer locations, the memory manager updating the watch memory to resemble the virtual watch memory by using the pointer relocation instructions to relocate the data pointers in the watch memory. relocation instructions that effectuate

* * * * *

UNITED STATES PATENT AND TRADEMARK OFFICE
CERTIFICATE OF CORRECTION

PATENT NO. : 6,157,982
DATED : December 5, 2000
INVENTOR(S) : Vinay Deo et al.

It is certified that error appears in the above-identified patent and that said Letters Patent is hereby corrected as shown below:

Column 5,
Line 12, change "return s" to -- returns --.

Column 6,
Line 56, add -- 74 -- after "RAM".

Column 12,
Line 48, delete "device" after "memory".
Line 52, add -- a -- before "virtual".
Line 54, change "pointer" to -- pointers --.
Line 57, change "arranging" to -- arrangement --.
Line 57, change "wihtin" to -- within --.

Signed and Sealed this

Sixth Day of November, 2001

Attest:

NICHOLAS P. GODICI
*Attesting Officer*    *Acting Director of the United States Patent and Trademark Office*